(12) United States Patent
Drzal

(10) Patent No.: US 10,091,923 B2
(45) Date of Patent: Oct. 9, 2018

(54) AUTOMATICALLY RAISED AND LOWERED WINDROW ROLLER

(71) Applicant: CNH Industrial America LLC, New Holland, PA (US)

(72) Inventor: Nathan R. Drzal, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 161 days.

(21) Appl. No.: 15/076,857

(22) Filed: Mar. 22, 2016

(65) Prior Publication Data

US 2017/0273230 A1 Sep. 28, 2017

(51) Int. Cl.
| | |
|---|---|
| *A01B 63/02* | (2006.01) |
| *A01D 43/10* | (2006.01) |
| *A01D 41/12* | (2006.01) |
| *A01D 41/14* | (2006.01) |
| *A01D 57/00* | (2006.01) |
| *A01D 82/00* | (2006.01) |

(52) U.S. Cl.
CPC .......... *A01B 63/02* (2013.01); *A01D 41/1243* (2013.01); *A01D 41/145* (2013.01); *A01D 57/00* (2013.01); *A01D 82/00* (2013.01)

(58) Field of Classification Search
CPC .. A01B 63/02; A01D 41/1243; A01D 41/145; A01D 57/00; A01D 82/00; A01D 43/10; A01D 34/8355; A01F 12/40
USPC ............ 56/10.1, 10.5, 10.6, 10.7, 10.8, 11.4, 56/13.3, 13.4, 13.5–13.9
See application file for complete search history.

(56) References Cited

U.S. PATENT DOCUMENTS

| | | | | | |
|---|---|---|---|---|---|
| 1,779,020 | A | * | 10/1930 | Swint ................. | A01D 34/8355 56/503 |
| 2,123,579 | A | * | 7/1938 | Weems ............... | A01D 34/8355 172/502 |
| 3,136,108 | A | * | 6/1964 | Wood .................... | A01D 33/06 171/58 |
| 3,312,048 | A | * | 4/1967 | Annat .................. | A01D 41/141 56/214 |
| 3,339,643 | A | * | 9/1967 | Scarborough .......... | A01B 29/00 172/184 |
| 3,387,437 | A | * | 6/1968 | Owen .................... | A01D 46/10 56/13.2 |
| 3,485,020 | A | * | 12/1969 | Burrough ............... | A01D 34/24 56/212 |
| 3,509,701 | A | * | 5/1970 | Clarke ................. | A01D 41/145 56/208 |
| 3,603,066 | A | * | 9/1971 | Burrough ............. | A01D 34/246 56/208 |

(Continued)

*Primary Examiner* — Robert E Pezzuto
*Assistant Examiner* — Joan D Misa
(74) *Attorney, Agent, or Firm* — Patrick M. Sheldrake

(57) ABSTRACT

An agricultural vehicle includes a chassis; a header carried by the chassis and including a cutter mechanism, the header being adjustable in a vertical direction; a swath roller carried by the chassis behind the header; a roller actuator connected to the swath roller and configured to adjust the swath roller in the vertical direction; and a controller coupled to the roller actuator. The controller is configured for: detecting when the header raises in the vertical direction; recording a header raising point where the header raises; determining when the swath roller reaches the header raising point; and signaling the roller actuator to raise the swath roller when the swath roller reaches the header raising point.

18 Claims, 6 Drawing Sheets

(56) References Cited

U.S. PATENT DOCUMENTS

| | | | |
|---|---|---|---|
| 3,604,186 A * | 9/1971 | Coleman | A01D 41/145 56/208 |
| 3,665,823 A * | 5/1972 | Chaney | E01C 19/266 404/128 |
| 3,731,468 A * | 5/1973 | Blumhardt | A01D 57/30 56/16.4 B |
| 3,895,880 A * | 7/1975 | Fink | E01C 19/266 180/20 |
| 4,269,535 A * | 5/1981 | Schultz | E02D 3/026 172/177 |
| 4,702,644 A * | 10/1987 | Cioffi | E01C 19/266 404/128 |
| 4,878,544 A * | 11/1989 | Barnhart | E01C 19/281 172/125 |
| 5,653,292 A | 8/1997 | Ptacek et al. | |
| 6,141,612 A | 10/2000 | Flamme et al. | |
| 6,708,777 B1 * | 3/2004 | Holmes | A01B 29/045 172/547 |
| 7,320,208 B2 | 1/2008 | Covington et al. | |
| 8,171,707 B2 * | 5/2012 | Kitchel | A01D 34/8355 56/504 |
| 8,430,179 B2 * | 4/2013 | Van Buskirk | A01B 29/048 111/139 |
| 8,560,182 B2 * | 10/2013 | Ringwald | A01D 41/141 56/10.2 E |
| 8,820,428 B2 * | 9/2014 | McCrea | A01B 29/02 111/130 |
| 8,966,871 B2 | 3/2015 | Nafziger et al. | |
| 2014/0366502 A1 * | 12/2014 | Miller | A01D 57/30 56/192 |
| 2015/0319924 A1 * | 11/2015 | Strobbe | A01D 43/006 56/14.7 |

\* cited by examiner

US 10,091,923 B2

AUTOMATICALLY RAISED AND LOWERED WINDROW ROLLER

BACKGROUND OF THE INVENTION

1. Field of the Invention

The present invention relates to agricultural vehicles, and, more particularly, to self-propelled windrowers.

2. Description of the Related Art

Self-propelled windrowers are utilized by farmers to cut crop material as the windrower advances across a field and arrange the cut crop material into windrows, which are deposited onto the field behind the windrower to dry. Typical windrowers have a header at the front which will cut the crop material and are driven by a pair of primary wheels linked to a power source, such as an internal combustion engine, and a pair of caster wheels at the rear of the windrower. Some windrowers are further equipped with a roller near the rear of the windrower which is referred to as a swath roller. The swath roller trails the header and serves to roll the crop material as the windrower advances, making the windrowed crop material less susceptible to being affected by wind.

Many windrowers are equipped with actuators, such as hydraulic cylinders, to raise and lower the header and the swath roller. The actuators are typically controlled by separate switches utilized by the operator, so the header and swath roller are raised and lowered separately. This allows the operator to raise the header at the end of a cut, while keeping the swath roller down to roll the cut crop material until the end of the cut is reached, at which point the operator can raise the swath roller. Once the operator wishes to return to cutting, the operator must then separately lower the header and the swath roller.

One problem with such systems is that the steps of separately raising and lowering the header and swath roller require the operator to remember to raise and lower both the header and swath roller. If the operator forgets to raise the swath roller after cutting and before a turn operation, for example, the roller can be damaged as the windrower turns. If the operator forgets to lower the swath roller after cutting resumes, some of the cut crop material will be un-rolled and more susceptible to being blown away by wind. Further, because the swath roller trails the header and the operator is typically sitting at the front of the windrower, it is difficult for the operator to reliably determine when the swath roller has reached the end of the cut crop material. The operator can either choose to raise the swath roller early, resulting in un-rolled crop material, or drive the windrower with the swath roller down for an unnecessarily long distance, which wastes fuel and time.

What is needed in the art is a windrower that can overcome some of the previously described disadvantages of known windrowers.

SUMMARY OF THE INVENTION

The present invention provides an agricultural vehicle with a controller that is configured for signaling a roller actuator to vertically move a swath roller in response to vertical movements of a header.

The invention in one form is directed to an agricultural vehicle including: a chassis; a header carried by the chassis and including a cutter mechanism, the header being adjustable in a vertical direction; a swath roller carried by the chassis behind the header; a roller actuator connected to the swath roller and configured to adjust the swath roller in the vertical direction; and a controller coupled to the roller actuator. The controller is configured for: detecting when the header raises in the vertical direction; recording a header raising point where the header raises; determining when the swath roller reaches the header raising point; and signaling the roller actuator to raise the swath roller when the swath roller reaches the header raising point.

The invention in another form is directed to a method of controlling an agricultural vehicle including a vertically adjustable header and a swath roller trailing the header and vertically adjustable by a roller actuator. The method includes the steps of: detecting when the header raises in a vertical direction; recording a header raising point where the header raises; determining when the swath roller reaches the header raising point; and signaling the roller actuator to raise the swath roller when the swath roller reaches the header raising point.

The invention in yet another form is directed to an agricultural vehicle including: a chassis; a header carried by the chassis and including a cutter mechanism, the header being adjustable in a vertical direction; a swath roller carried by the chassis behind the header; a roller actuator connected to the swath roller and configured to adjust the swath roller in the vertical direction; and a controller coupled to the roller actuator. The controller is configured for: detecting when the header moves in the vertical direction; and signaling the roller actuator to move the swath roller in the same vertical direction as the header.

An advantage of the present invention is an operator only needs to utilize one switch to raise and/or lower both the header and swath roller.

Another advantage is the controller can determine when the swath roller has reached the end of a cut and then raise the swath roller, decreasing the risks of leaving behind unrolled crop material or driving the windrower further than necessary.

Yet another advantage is the controller can be configured to raise and lower the swath roller in response to various conditions of the header and vehicle position.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
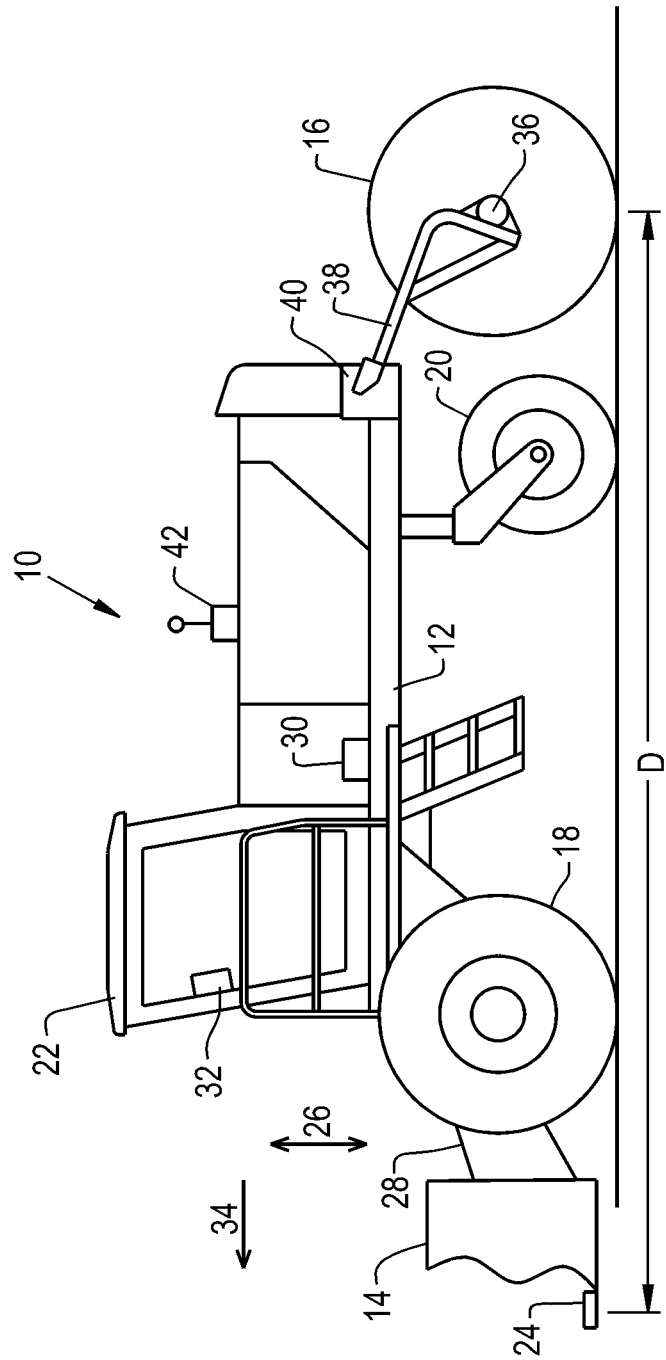
FIG. 1 is a side view of an embodiment of a self-propelled windrower formed according to the present invention with a header and a swath roller in a lowered position.

Referring now to the drawings, and more particularly to FIG. 1, there is shown an embodiment of a self-propelled windrower 10 according to the present invention which generally includes a chassis 12, a header 14 carried by the chassis 12, and a swath roller 16 carried by the chassis 12 behind the header 14. For propulsion across a field, the windrower 10 includes a pair of primary wheels 18 at a front of the windrower 10 that are driven by a power source, such as an internal combustion engine (not shown). The windrower 10 also includes a pair of caster wheels 20 at a rear of the windrower 10 that can swivel. While the windrower 10 is shown as including both primary wheels 18 and caster wheels 20, any arrangement of wheels can be used to propel the windrower 10 across a field, with the present arrangement being shown as an example only. The windrower 10 also has an operator cab 22 at the front of the windrower 10 where an operator will control functions of the windrower 10 as the windrower 10 travels across a field.

Figure 2:
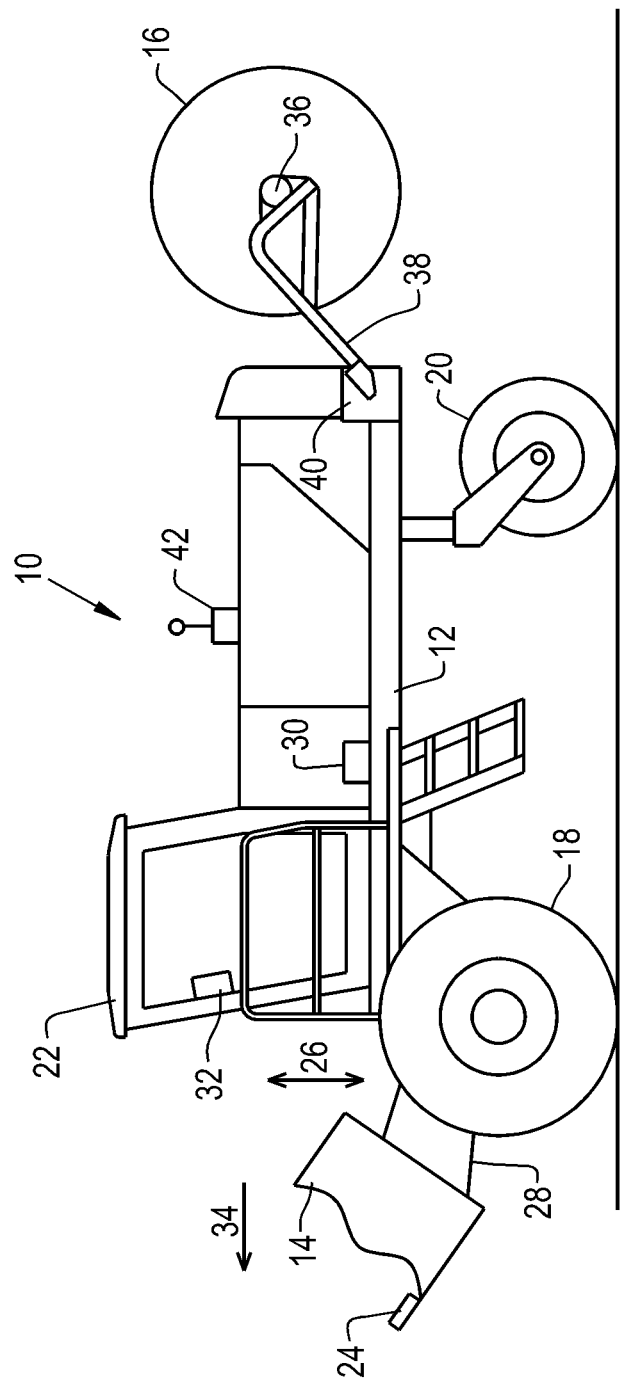
FIG. 2 is a side view of the self-propelled windrower shown in FIG. 1 with the header and swath roller in a raised position.
Figure 3:
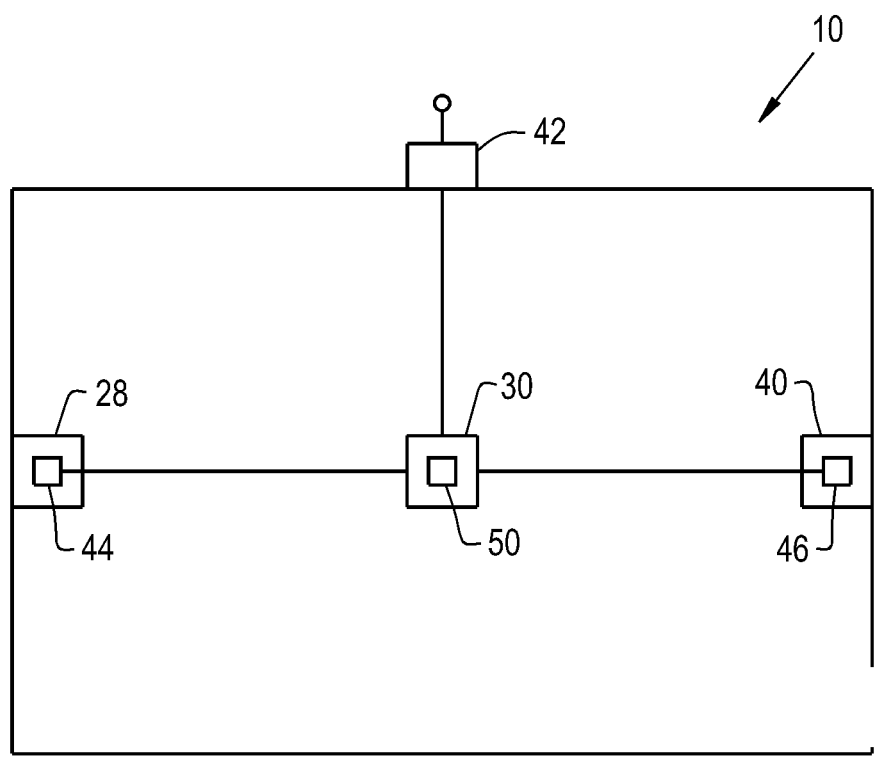
FIG. 3 is a schematic view of various components of the self-propelled windrower shown in FIGS. 1-2.

The header 14 includes a cutter mechanism 24 to allow the header 14 to cut crop material as the windrower 10 advances across a field. The cutter mechanism 24 can be any sort of mechanism that can cut crop material from the field, such as the shown cutter bar. The header 14 can also include a reel (not shown) which directs uncut crops in the field toward the cutter mechanism 24 and a conveying mechanism (not shown) which direct crops toward a center of the header 14 to produce crop windrows as the windrower 10 advances across the field. The header 14 is adjustable in a vertical direction, designated by arrow 26, by a header actuator 28 connected to the header 14 and the chassis 12. The header actuator 28 can include, for example, a hydraulic or pneumatic cylinder linked to the header 14 that utilizes fluid pressure to raise and lower the header 14. A controller 30 can be linked to the header actuator 28, as shown in FIG. 3, and receive commands from an operator in the operator cab 22 to signal the header actuator 28 to raise or lower the header 14. The controller 30 can be any type of element that is capable of receiving and sending electronic signals according to a set of instructions. The operator may, for example, utilize a physical switch (not shown) located in the cab 22 to cause the controller 30 to signal and activate the header actuator 28 or press a graphic in a graphical user interface shown on a touchscreen display 32 in the cab 22 to cause the controller 30 to signal and activate the header actuator 28. Such arrangements are known in the art and therefore warrant no further description. As shown in FIG. 1, the header 14 is lowered to a level that allows the cutter bar 24 to cut crop material as the windrower 10 advances in a forward travel direction 34. Once the cutter bar 24 reaches the end of its cut, the operator can activate the controller 30 to signal the header actuator 28 to raise the header 14 in the vertical direction 26 so the header 14 raises to allow the windrower 10 to complete a turning operation, as shown in FIG. 2. Alternatively, the windrower 10 can be an automatically guided windrower where the controller 30 is preconfigured to raise the header 14 at various points in the field, which will be described further herein.

The swath roller 16 trails the header 14 and rolls across the field so that as the windrower 10 advances in the field, the swath roller 16 engages crop material which has been cut by the header 14 and rolls the cut crop material into more densely packed windrows that are resistant to crop material loss due to blowing wind. The swath roller 16 can be formed as a tapering wheel with a varying diameter, with two lateral ends of the swath roller 16 having a greatest diameter of the roller 16 and a center of the swath roller 16 having a smallest diameter of the roller 16. It should be appreciated that other geometries of the swath roller 16 can also be utilized, so long as the swath roller 16 can roll across the field as the windrower 10 travels across the field. The swath roller 16 pivots about a roller axle 36 which can be linked to a pair of roller arms 38, one at each lateral end of the swath roller 16, which are connected to a roller actuator 40 mounted to the rear of the windrower 10 which can vertically raise and lower the swath roller 16. The roller actuator 40 raises and lowers the swath roller 16 analogously to the header actuator 28 raising and lowering the header 14, and can be a similar configuration, such as a hydraulic or pneumatic actuator. The roller actuator 40 is coupled to the controller 30, as shown in FIG. 3, which is configured to signal the roller actuator 40 to move the swath roller 16 in the vertical direction 26 when desired, which will be further described below.

As the windrower 10 advances in the forward travel direction 34, the cutter bar 24 of the header 14 will cut crop material for windrowing. After the crop material is cut, the header 14 deposits the cut crop material behind the header 14 in the path of the forwardly advancing swath roller 16, which will roll over the cut crop material and more densely pack the windrow. As the swath roller 16 must be behind the header 14 to effectively roll the cut crop material, a separation distance D is maintained between the header 14 and the swath roller 16 when the header 14 and swath roller 16 are lowered, as shown in FIG. 1. Once the header 14 has been advanced sufficiently to finish a cut, the header 14 can be raised to prepare for a turn, with the header 14 shown in FIG. 2 being in the raised position. However, due to the swath roller 16 trailing the header 14 by the separation distance D, the swath roller 16 raising at the same time as the header 14 will cause some of the cut crop material to be unrolled. To roll all of the cut crop material, the windrower 10 must travel at least the separation distance D past where the header 14 is raised before raising the swath roller 16 to its raised position, which is also shown in FIG. 2. Once the header 14 and swath roller 16 are in their respectively raised positions, the windrower 10 can then be turned without risking damage to the header 14 or swath roller 16 caused by the turn operation.

To make sure the swath roller 16 travels the separation distance D past where the header 14 is raised, the controller 30 can be coupled to a location sensor 42, such as a Global Positioning Satellite (GPS) sensor, which determines the current geographic location of the windrower 10. The location sensor 42 can be any type of sensor capable of gathering positional information about the windrower 10, and does not need to be a GPS sensor. Referring now to FIG. 3, it can be seen that the controller 30 can therefore be coupled to the header actuator 28, the roller actuator 40, and the location sensor 42 to allow the controller 30 to gather positional information about the windrower 10, in general, and the header 14 and swath roller 16, specifically. The controller 30 can also be coupled to solenoid valves 44 and 46 of the header actuator 28 and the roller actuator 40, respectively, with the controller 30 signaling the header actuator 28 and roller actuator 40 to activate and raise or lower the linked header 14 and swath roller 16 when desired by selectively activating the respective solenoid valve 44, 46 of the actuators 28 and 40. Coupling the controller 30 to the location sensor 42 and the actuators 28 and 40 allows the controller 30 to automatically raise and lower the swath roller 16 in response to movement of the header 14 in the vertical direction as well as movement of the windrower 10 in the forward travel direction 34, which will be described further herein.

Figure 4:
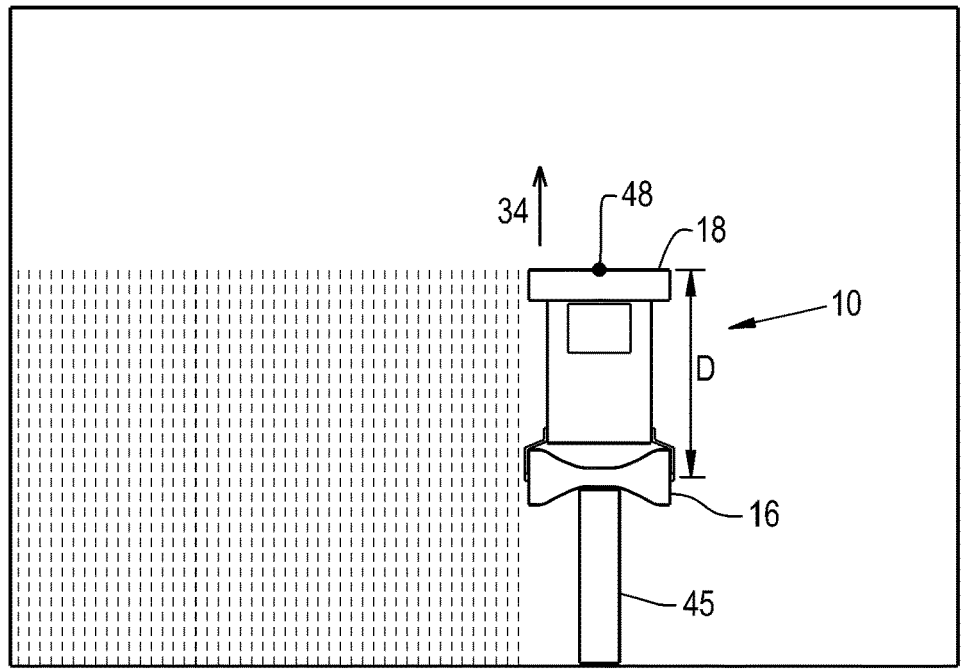
FIG. 4 is a top view of the self-propelled windrower shown in FIG. 1 advancing across a field and raising the header of the windrower.

Referring now to FIG. 4, a top view of the windrower 10 in a field is shown. As can be seen, the windrower 10 has traveled across the field such that the cutter bar 24 of the header 14 has reached the end of the cut. While the swath roller 16 has rolled most of the cut crop into a rolled windrow 45 once the header 14 reaches the end of the cut, not all of the cut crop material is rolled. Since the header 14 has reached the end of the cut, the header 14 can be raised by the operator at this point. To raise the header 14, the operator can, for example, activate a switch (not shown) coupled to the controller 30 that causes the controller 30 to signal the solenoid valve 44 of the header actuator 28 in a way that the header actuator 28 will raise the header 14 in the vertical direction 26 to the position shown in FIG. 2. As the controller 30 signals the solenoid valve 44 of the header actuator 28 to raise the header 14, signifying that the header 14 is being raised, the controller 30 can also query the location sensor 42 to determine a current geographic position of the windrower 10, which is hereafter referenced as a header raising point 48 shown in FIG. 4. Once the header raising point 48 has been recorded by the controller 30, the controller 30 can then determine when the swath roller 16 reaches the header raising point 48, at which point the controller 30 will automatically signal the solenoid valve 46 of the roller actuator 40 to activate and raise the swath roller 16 to the raised position shown in FIG. 2. The controller 30 can determine the swath roller 16 has reached the header raising point 48 in a variety of ways. For example, the controller 30 can record the header raising point 48 in a memory 50 (shown in FIG. 3) of the controller 30 as a zero position point. Assuming the windrower 10 is traveling straight in the forward travel direction 34, the controller 30 can then query the location sensor 42 to determine the distance that the windrower 10, and specifically the swath roller 16, has traveled past the header raising point 48.

Figure 5:
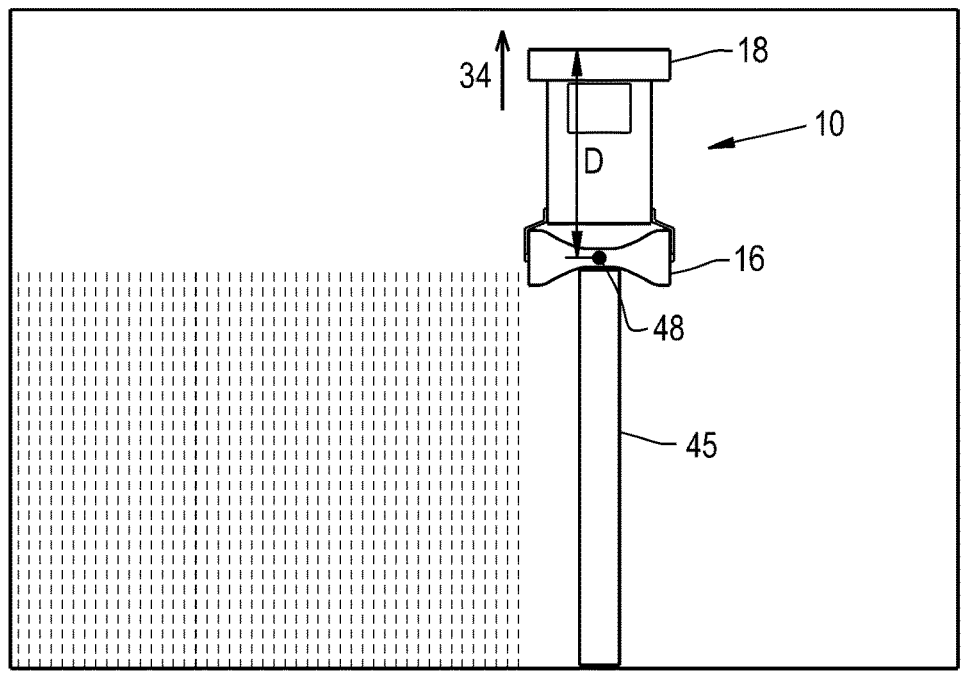
FIG. 5 is another top view of the self-propelled windrower shown in FIGS. 1 and 4 and raising the swath roller.

Once the windrower 10 has traveled the separation distance D past the header raising point 48, as shown in FIG. 5, the swath roller 16 has rolled all the cut crop material into the rolled windrow 45 and the controller 30 can automatically signal the solenoid valve 46 of the roller actuator 40 to activate and raise the swath roller 16. The controller 30 can make this determination by querying the location sensor 42 for a current location of the sensor 42 and then computing the distance between the location sensor 42 and the header raising point 48, which can be set as a zero position point. The separation distance D can also be stored in the memory 50 as a constant value. Once the controller 30 determines that the distance between the location sensor 42 and the header raising point 48 is equal to the separation distance D, the controller 30 can then signal the roller actuator 40 to raise the swath roller 16 at the header raising point 48 so the swath roller 16 rolls all of the crop material cut by the header 14. If desired, the controller 30 can then also cause an audio and/or visual alert to be sent to the operator cab 22, alerting the operator within that the windrower 10 can be safely turned. Rather than working in conjunction with the location sensor 42 to determine that the windrower 10 has traveled the separation distance D past the header raising point 48, the controller 30 can be coupled to the speedometer of the windrower 10 to determine the distance that the vehicle has traveled past the header raising point 48 according to the equation: travel distance=velocity×time. Other ways to determine that the swath roller 16 has reached the header raising point 48 are also possible, depending on the hardware included with the windrower 10, and it should be appreciated that any suitable way can be utilized by the controller 30 to determine that the swath roller 16 has reached the header raising point 48. While the previous description relates to an operator causing the header 14 to raise at the header raising point 48, the controller 30 can also be configured as an auto-guidance unit with multiple header raising points 48 saved in the memory 50 of the controller 30. In such a case, the controller 30 can be configured to automatically signal the header actuator 28 to raise the header 14 once the header 14 reaches a header raising point 48, with the controller 30 then automatically signaling the roller actuator 40 to raise the swath roller 16 when the swath roller 16 reaches a header raising point 48.

After the windrower 10 has finished turning, the operator can then activate the controller 30 to signal the header actuator 28 to lower to the cutting position, which is shown in FIG. 1. Since the header 14 and roller swath 16 are primarily raised to avoid damage during turning, the controller 30 can simultaneously signal the roller actuator 40 to lower the swath roller 16 at the same time as the header 14, since it is assumed that the header 14 is being lowered during straight travel of the windrower 10. By having the controller 30 automatically lowering the roller swath 16 at the same time as the header 14, the operator does not need to remember to lower the roller swath 16, avoiding the occurrence of unrolled windrows, and can focus on other aspects of windrowing. To avoid premature lowering (and associated damage) of the header 14 and swath roller 16 during a turn, the controller 30 can be configured to prevent sending a lowering signal to the header actuator 28 and roller actuator 40 while the windrower 10 is turning. Alternatively, the header 14 being lowered can be detected and recorded by the controller 30 as a header lowering point, analogous to the header raising point 48 previously described, with the controller 30 then recording the header lowering point and determining when the swath roller 16 has reached the header lowering point in a similar fashion to the controller 30 determining when the swath roller 16 has reached the header raising point 48. In the case of an auto-guidance controller, multiple header lowering points can be stored in a memory of the controller, similarly to the previously described header raising points. It should therefore be appreciated that the controller 30 according to the present invention can be configured in a variety of ways to coordinate raising and lowering of the header 14 and swath roller 16 and minimize the risk of the swath roller 16 not being raised or lowered after the header 14 has been raised or lowered.

Figure 6:
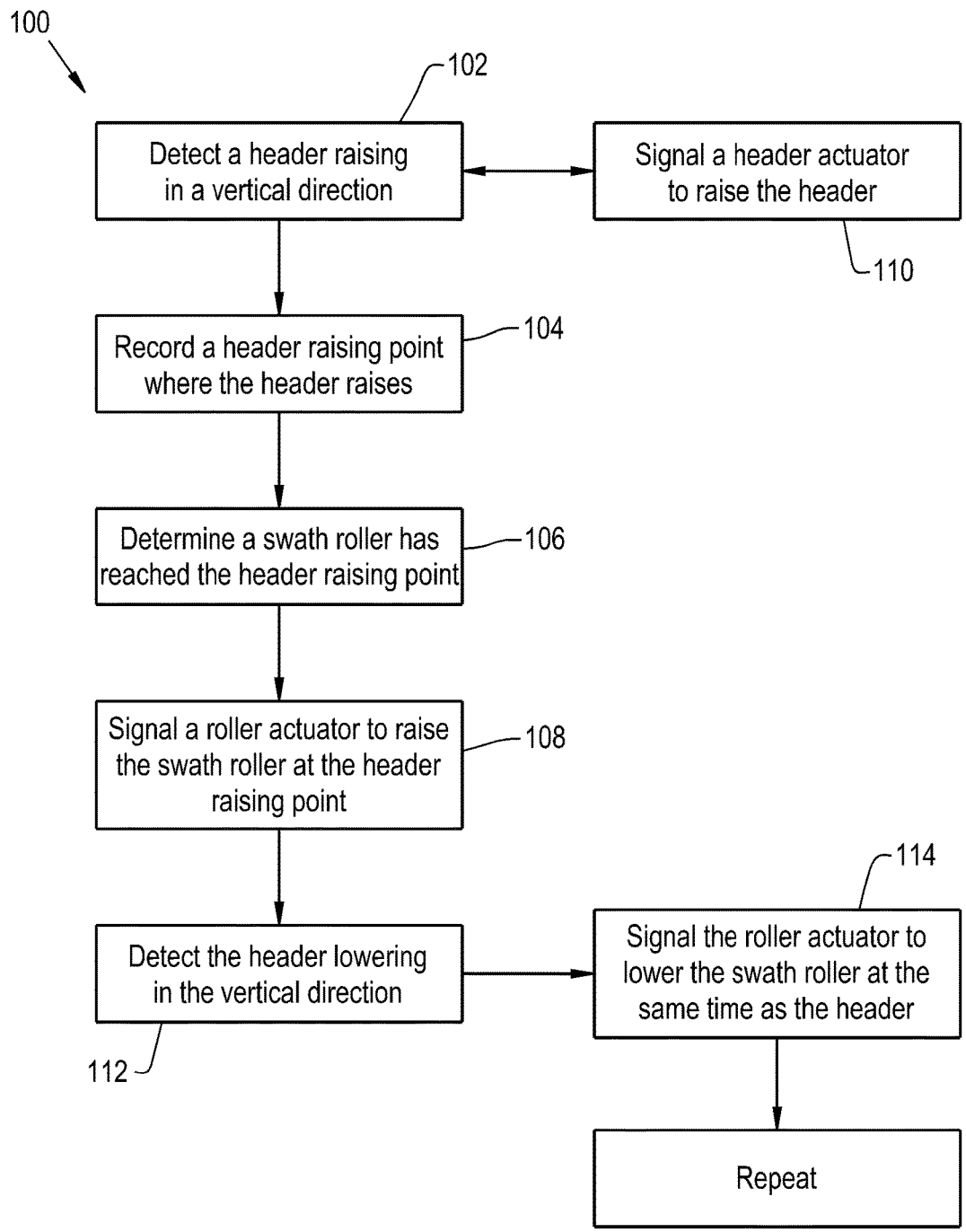
FIG. 6 is a flow chart of an embodiment of a method according to the present invention.

Referring now to FIG. 6, an embodiment of a method 100 being performed by the windrower 10 according to the present invention is shown as a flow chart. The method 100 can begin by the controller 30 detecting 102 that the header 14 raises in the vertical direction 26, signifying that the windrower 10 has reached the end of a cut. The controller 30 can query the location sensor 42 to record 104 the header raising point 48 where the header 14 raises. The controller 30 can then determine 106 when the swath roller 16 reaches the header raising point 48, in conjunction with the location sensor 42 or another element of the windrower 10. Once the swath roller 16 has reached the header raising point 48, the controller 30 can signal 108 the roller actuator 40 to vertically raise the swath roller 16 to ensure that most, if not all, cut crop material is rolled prior to the swath roller 16 raising.

The controller 30 can detect 102 that the header 14 has raised by, for example, signaling 110 the header actuator 28 to vertically raise the header 14, with the signal used to raise the header 14 also acting as the signal indicating the header 14 has been raised. Once the operator wishes for the header 14 and swath roller 16 to lower, such as after a turning operation, the operator can instruct the controller 30 to signal the header actuator 28 to lower the header 14. The controller 30 detects 112 the header 14 lowering and can also signal 114 the roller actuator 40 to lower at the same time as the header 14. Following the header 14 and swath roller 16 being returned to the lowered position, the controller 30 can then reset and wait until the header 14 is raised again to repeat the sequence.

Figure 7:
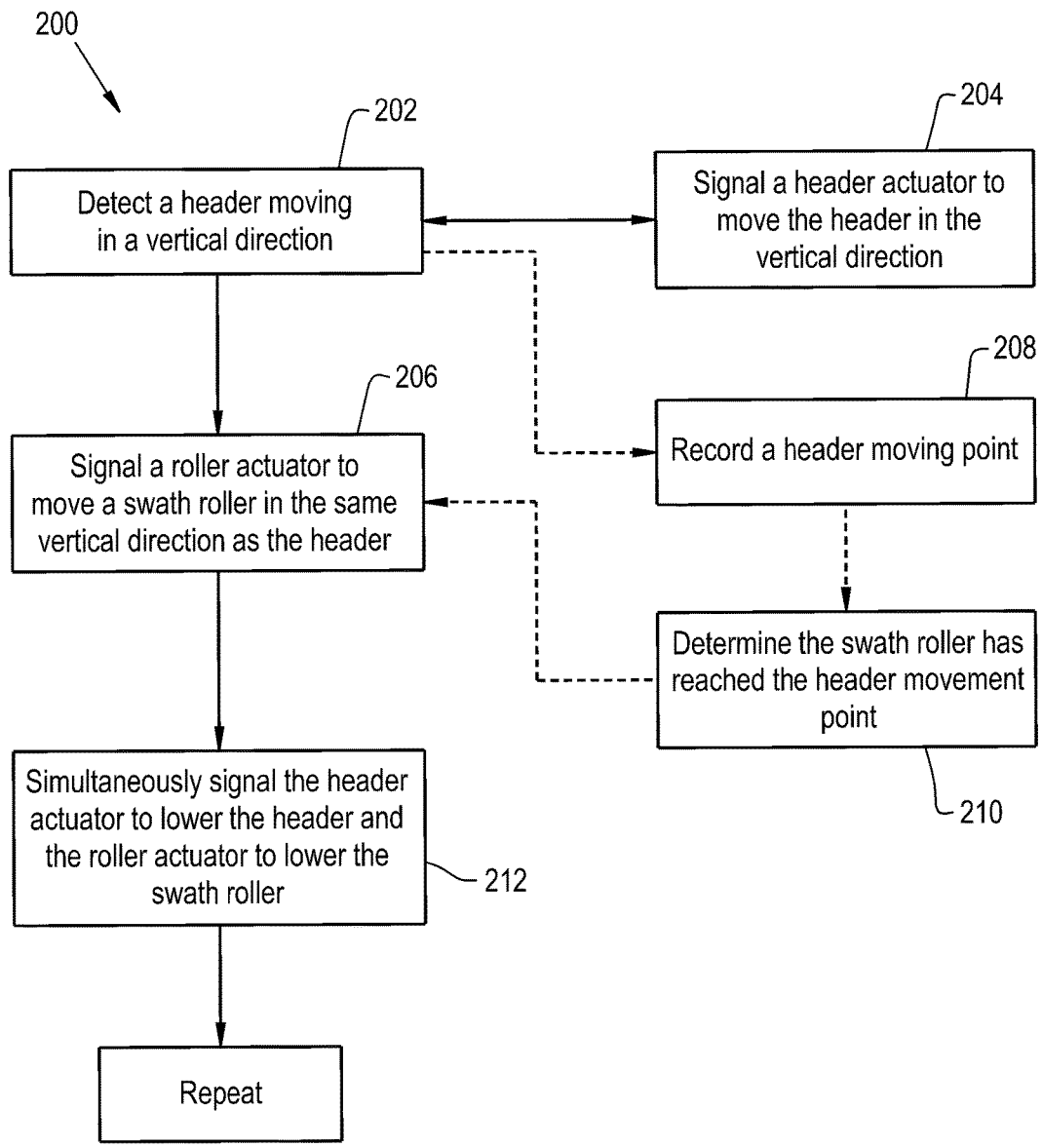
FIG. 7 is a flow chart of another embodiment of a method according to the present invention.

Referring now to FIG. 7, another embodiment of a method 200 being performed by the windrower 10 according to the present invention is shown as a flow chart. The method 200 begins by detecting 202 that the header 14 has moved in the vertical direction 26, which can be simultaneously performed with the previously described controller 30 signaling 204 the header actuator 28 to move the header 14 in the vertical direction 26. Once the header 14 is moved in the vertical direction 26, either by raising or lowering the header 14, the controller 30 signals 206 the roller actuator 40 to move the swath roller 16 in the same vertical direction 26 as the header 14. This eliminates the need for an operator to remember to take a separate action to move the swath roller 16 in the same vertical direction as the header 14, reducing the likelihood of the swath roller 16 not raising before a turning operation or not lowering to roll cut crop material. To ensure that cut crop material is rolled efficiently, the controller 30 can record 208 a header movement point, such as header raising point 48 or a similar header lowering point, where the header 14 moves in the vertical direction 26. The controller 30 can then determine 210 when the swath roller 16 reaches the header movement point, in conjunction with the location sensor 42 or otherwise, at which time the controller 30 signals 206 the roller actuator 40 to move the swath roller 16 in the same vertical direction 26 as the header 14. In some instances, it may be desired to only have one vertical movement of the swath roller 16 occur when the swath roller 16 reaches the header movement point, such as when the header 14 is raised. In one such case, the controller 30 can be configured to only determine 210 when the swath roller 16 reaches the header raising point 48, with the swath roller 16 being raised at the header raising point 48, and signal the roller actuator 40 to lower the swath roller 16 simultaneously with signaling 212 the header actuator 28 to lower the header 14. When the header 14 and swath roller 16 are both raised or lowered to the desired level, as shown in FIGS. 1-2, the controller 30 can be reset and wait until the header 14 is moved in the vertical direction 26 to restart the sequence.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
   a chassis;
   a header carried by said chassis and including a cutter mechanism, said header being adjustable in a vertical direction;
   a swath roller carried by said chassis behind said header;
   a roller actuator connected to said swath roller and configured to adjust said swath roller in the vertical direction; and
   a controller coupled to said roller actuator, said controller being configured for:
      determining a header raising point where said header raises in a vertical direction;
      determining when said swath roller reaches said header raising point; and
      signaling said roller actuator to raise said swath roller after the header raises when said swath roller reaches said header raising point;
   wherein said header raisin point is a field location.

2. The agricultural vehicle according to claim 1, wherein said controller is further configured for:
   detecting when said header lowers in the vertical direction; and
   signaling said roller actuator to lower said swath roller when said header lowers.

3. The agricultural vehicle according to claim 1, further comprising a location sensor coupled to said controller.

4. The agricultural vehicle according to claim 3, wherein said controller records said header raising point and determines when said swath roller reaches said header raising point in conjunction with said location sensor.

5. The agricultural vehicle according to claim 1, wherein said roller actuator is one of a hydraulic actuator and a pneumatic actuator.

6. The agricultural vehicle according to claim 5, wherein said controller is coupled to a solenoid valve of said roller actuator.

7. The agricultural vehicle according to claim 1, further comprising a header actuator linked to said header and configured to adjust said header in the vertical direction, said controller being coupled to said header actuator.

8. The agricultural vehicle according to claim 7, wherein said controller is further configured for signaling said header actuator to raise said header in the vertical direction, said signaling of said header actuator and said detecting when said header raises occurring simultaneously.

9. A method of controlling an agricultural vehicle including a vertically adjustable header and a swath roller trailing said header and vertically adjustable by a roller actuator, comprising the steps of:
   recording a header raising point with a control system where said header raises in a vertical direction, wherein the header raising point is a geographic location;
   determining with the control system when said swath roller reaches said header raising point; and
   signaling with the control system said roller actuator to raise said swath roller when said swath roller reaches said header raising point
   wherein the raising of the swath roller occurs after the raising of the header during forward travel based on a separation distance of the swath roller and header.

10. The method according to claim 9, further comprising the steps of detecting when said header lowers in the vertical direction; and signaling said roller actuator to lower said swath roller when said header lowers.

11. The method according to claim 9, wherein said detecting and recording steps are performed by a controller operating in conjunction with a location sensor.

12. The method according to claim 9, further comprising the step of signaling a header actuator to raise said header, wherein said header actuator signaling step and said detecting step occur simultaneously.

13. An agricultural vehicle, comprising:
   a chassis;
   a header carried by said chassis and including a cutter mechanism, said header being adjustable in a vertical direction;
   a swath roller carried by said chassis behind said header;
   a roller actuator connected to said swath roller and configured to adjust said swath roller in the vertical direction; and
   a controller coupled to said roller actuator, said controller being configured for:
      determining when said header moves in the vertical direction; and
      signaling said roller actuator to move said swath roller in the same vertical direction as said header after a delay from when the header was moved in the vertical direction wherein the delay is related to a separation distance between the header and the swath roller.

14. The agricultural vehicle according to claim 13, wherein said controller is further configured for:
   recording a header movement point where said header moves in the vertical direction; and
   determining when said swath roller reaches said header movement point, wherein said controller signals said roller actuator to vertically move said swath roller when said swath roller reaches said header movement point.

15. The agricultural vehicle according to claim 14, wherein said controller only records said header movement point when said header raises in the vertical direction.

16. The agricultural vehicle according to claim 14, further comprising a location sensor coupled to said controller, said controller recording said header movement point and determining when said swath roller reaches said header movement point in conjunction with said location sensor.

17. The agricultural vehicle according to claim 13, further comprising a header actuator configured to move said header in the vertical direction, said controller being coupled to said header actuator.

18. The agricultural vehicle according to claim 17, wherein said controller is configured for signaling said header actuator to move said header in the vertical direction, said controller detecting said header moving in the vertical direction when said controller signals said header actuator.

* * * * *